United States Patent Office 3,555,018
Patented Jan. 12, 1971

3,555,018
THIAZINOPYRIDOINDOLONE DERIVATIVES
Martin A. Davis, Montreal, Quebec, Canada, assignor to Ayerst, McKenna & Harrison Limited, Ville St. Laurent, Quebec, Canada, a corporation of Canada
No Drawing. Filed Dec. 3, 1968, Ser. No. 780,890
Int. Cl. C07d 93/12
U.S. Cl. 260—243                                             10 Claims

ABSTRACT OF THE DISCLOSURE

There are disclosed herein 2,3,6,7,12,12b-hexahydro-4H-1,3 - thiazino[3',2':1,2]pyrido[3,4-b]indol-4-one and its 10-chloro-, 11-chloro-, 10-methyl-, 9-methoxy-, 10-methoxy-, 9,10-dimethoxy-, 8-nitro-, and 10-nitro- derivatives. The compounds have antiinflammatory and antifungal activities and methods for their preparation and use are also disclosed.

---

This invention relates to novel chemical compounds having useful biological properties. More specifically relates to novel 2,3,6,7,12,12b-hexahydro-4H-1,3-thiazino-[3',2':1,2]pyrido[3,4-b]indol-4-ones of the following general Formula I:

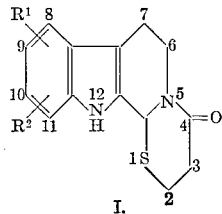

wherein $R^1$ and $R^2$ may each represent a hydrogen atom, a halogen such as, for example, fluorine, chlorine, bromine or iodine, a lower alkoxy group containing from 1 to 3 carbon atoms such as, for example, the methoxy, ethoxy or propoxy groups, or the nitro group.

The novel compounds of this invention, which are derivatives of a novel heterocyclic system, may be readily prepared by condensation of a 3,4-dihydro-β-carboline or a suitably substituted 3,4-dihydro-β-carboline of Formula II with a lower alkyl ester of 3-mercaptopropionic acid of Formula III. The reaction is advantageously carried out with the methyl ester of 3-mercaptopropionic acid in an inert solvent such as, for example, toluene, and preferably at the boiling point of such a solvent. The product is isolated, preferably by precipitation from the reaction mixture, and purified by recrystallization or by chromatography on a suitable adsorbent. The following formulae, wherein $R^3$ represents a lower alkyl group containing from 1 to 3 carbon atoms, such as for example, the methyl, ethyl or propyl group, and $R^1$ and $R^2$ are as defined above, illustrate the chemical reaction involved.

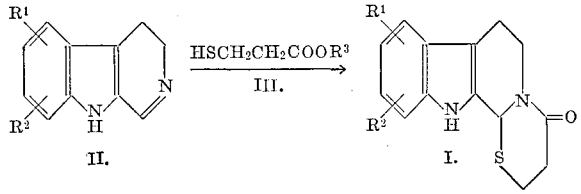

It will be apparent to those skilled in the art that a suitably substituted 3,4-dihydro-β-carboline will give the corresponding thiazinopyridoindolone derivative when treated in the above manner. Thus, 6-methoxy-3,4-dihydro-β-carboline affords the corresponding 9-methoxy-2,3,6,7,12,12b-hexahydro - 4H - 1,3 - thiazino[3',2':1,2] pyrido[3,4-b]indol-4-one.

3,4-dihydro-b-carboline itself is obtained by the cyclisation of N-formaltryptamine as described, inter alia, by C. Szantay et al., Periodica Polytech., vol. 9, p. 231 (1965) and by Y. Kanaoka et al., Chem. Pharm, Bull., (Tokyo), vol. 15, p. 101 (1967). In the same manner, 6-chlorotryptamine, 7-chlorotryptamine, 6-methyltryptamine, 5-methoxytryptamine, 6-methoxytryptamine, 5,6-dimethoxytryptamine (prepared as described by Bucourt and Joly in U.S. Pat. 2,920,080, issued Jan. 5, 1960) and 4-nitrotryptamine and 6-nitrotryptamine (prepared as described by J. B. McKay et al., in Can. J. Chem., vol. 41, p. 2585 (1963)) yield the correspondingly substituted N-formyltryptamines which are then cyclized according to the method of Kanaoka et al. cited above to yield the correspondingly substituted 3,4 - dihydro - β - carbolines. Those last-named compounds are reacted with a lower alkyl ester, preferably the methyl ester, of 3-mercaptopropionic acid in the manner described above, to yield the correspondingly substituted 2,3,6,7,12,12b-hexahydro-4H-1,3-thiazino[3',2':1,2]pyrido[3,4-b]indol-4-ones.

The novel compounds of this invention possess useful biological properties. Thus, when tested in warm-blooded animals, for example rats, in a procedure similar to that described by Winter et al., in Proc. Soc. Exp. Biol. Med., vol. 111, p. 544 (1962), they will inhibit in warm-blooded animals the inflammation caused by the local injection of an irritant such as carragee in and are antiinflammatory agents. For use as such the compounds may be formulated as dry powder capsules or as compressed tablets containing the active ingredient together with suitable binders, lubricants and excipients. The unit dosage forms are compounded so as to contain from 10 to 300 mg. of the active ingredients and may be administered orally once to four times daily.

The compounds of this invention, when tested by the method described by Rammelkamp in Proc. Soc. Exp. Med., vol. 51, p. 95 (1942), or in the procedure described by Grove and Randall in Assay Methods of Antibiotics, Medical Encyclopendias Inc., New York 1955, inhibit the growth of certain pathogenic fungi such as, for example, *Candian albicans*, *Microsporum gypseum*, and *Trichophyton granulosum*, and are useful as antifungal agents. As such they may be formulated in solutions, lotions, creams, or ointments containing from 0.1 to 5.0 percent of the active ingredients, together with the suitable vehicles and/or excipients, and may be applied topically to infected areas of the skin from one to four times daily.

The following descriptive examples will illustrate this invention.

EXAMPLE 1

2,3,6,7,12,12b-hexahydro-4H-1,3-thiazino[3',2':1,2] pyrido[3,4-b]indol-4-one

To a solution of 3,4-dihydro-β-carboline (4.0 g., 0.0235 mole) in dry toluene (125 ml.) is added methyl 3-mercaptopropionate (5.65 g., 0.047 mole). The solution is heated under reflux for 48 hours. The reaction mixture is diluted with hexane to give a dark red precipitate which is separated. This is triturated with hexane to give a solid which is recrystallized from chloroform, without heating, to M.P. 227–229° C.

Further purification is obtained by chromatography in chloroform solution on a column of silica (120 g.) and elution with a large volume of chloroform until the product appears homogenous on a thin-layer chromatogram. Recrystallization from chloroform without heating yields the title compound with M.P. 229–231° C., also identified by elemental analysis;

$\lambda_{max.}^{Ethanol}$ 276, 283, 293, 223 m$\mu$, $\epsilon$ 10150, 10150, 8180, 37000; $\gamma_{max.}^{Nujol}$ 1600, 3200 cm.$^{-1}$.

EXAMPLE 2

Substituted N-formyltryptamines 6-chlorotryptamine (2.1 g.) is heated with formamide (1.1 g.) at 175° C. for five hours. Excess formamide is removed under reduced pressure, the residue is taken up in chloroform, washed three times with 10% hydrochloric acid, then with saturated aqueous sodium chloride solution, and dried over anhydrous sodium sulfate. Evaporation of the solvent under reduced pressure yields 6-chloro-N-formyltryptamine as an oil which is used without purification in the subsequent step. In the same manner, when using 7-chloro-, 6-methyl-, 5-methoxy-, 6-methoxy-, 5,6-dimethyoxy-, 4-nitro-, or 6-nitrotryptamine as the starting material, the corresponding 7-chloro-N-formyltryptamine, 6-methyl-N-formyltryptamine, 5-methoxy-N-formyltryptamine, 6-methoxy-N-formyltryptamine, 5,6-dimethoxy-N-formyltryptamine, 4 - nitro-N-formyltryptamine, and 6-nitro-N-formyltryptamine are obtained as oils and are also used without purification in the following step.

EXAMPLE 3

Substituted 3,4-dihydro-β-carbolines

To a solution of 6-chloro-N-formyltryptamine (1.1 g.), obtained as described in Example 2, in chloroform (100 ml.), polyphosphate ester (6 g.) is added slowly at room temperature and the mixture is stirred at room temperature for 1.5 hours, after which time it is cooled in an ice bath and cold water is added with stirring for two hours. The chloroform is removed under reduced pressure, the mixture is extracted with ethyl acetate and then made alkaline with 10% aqueous sodium hydroxide. The precipitate is decanted, taken up in ether, and the ether solution is washed with saturated aqueous sodium chloride solution and dried with anhydrous sodium sulfate. Evaporation of the solvent under reduced pressure yields 7-chloro-3,4-dihydro-β-carboline as a heavy viscous oil, $\lambda_{max.}^{Nujol}$ 1620 cm.$^{-1}$ which is used in the subsequent step without further purification.

In the same manner, when using as starting material 7-chloro-, 6-methyl-, 5-methoxy-, 6-methoxy-, 5,6-dimethoxy-, 4-nitro-, or 6-nitro-N-formyltryptamine, obtained as described in Example 3, and proceeding as above, there are obtained, respectively, 8-chloro-3,4-dihydro-β-carboline, $\gamma_{max.}^{Nujol}$ 1618 cm.$^{-1}$ 7-methyl-3,4-dihydro-β-carboline, $\gamma_{max.}^{Nujol}$ 1622 cm.$^{-1}$ 6-methoxy-3,4-dihydro-β-carboline, $\gamma_{max.}^{Nujol}$ 1620 cm.$^{-1}$ 7-methoxy-3,4-dihydro-β-carboline, $\gamma_{max.}^{Nujol}$ 1624 cm.$^{-1}$ 6,7-dimethoxy-3,4-dihydro-β-carboline, $\gamma_{max.}^{Nujol}$ 1625 cm.$^{-1}$ 5-nitro-3,4-dihydro-β-carboline, $\gamma_{max.}^{Nujol}$ 1620 cm.$^{-1}$ and 7-nitro-3,4-dihydro-β-carboline, $\gamma_{max.}^{Nujol}$ 1621 cm.$^{-1}$ All of the above substituted 3,4-dihydro-β-carbolines are obtained as oils and are used as such, without further purification, in the subsequent step.

EXAMPLE 4

In the same manner as described in Example 1, but using as starting materials 7-chloro-, 8-chloro-, 7-methyl-, 6-methoxy-, 7-methoxy-, 6,7-dimethoxy-, 5-nitro-, or 7-nitro-3,4-dihydro-β-carboline, obtained as described in Example 3, there are obtained, respectively, 10-chloro-2,3,6,7,12,12b-hexahydro-4H-1,3-thiazino[3',2':1,2]pyrido[3,4-b]indol-4-one, $\gamma_{max.}^{Nujol}$ 3218 cm.$^{-1}$ 11-chloro-2,3,6,7,12,12b-hexahydro-4H-1,3-thiazino[3',2':1,2]pyrido[3,4-b]indol-4-one, $\gamma_{max.}^{Nujol}$ 3222 cm.$^{-1}$ 10-methyl-2,3,6,7,12,12b-hexahydro-4H-1,3-thiazino[3',2':1,2]pyrido[3,4-b]indol-4-one, $\gamma_{max.}^{Nujol}$ 3225 cm.$^{-1}$ 9-methoxy-2,3,6,7,12,12b-hexahydro-4H-1,3-thiazino[3',2':1,2]pyrido[3,4-b]indol-4-one, $\gamma_{max.}^{Nujol}$ 3221 cm.$^{-1}$ 10-methoxy-2,3,6,7,12,12b-hexahydro-4H-1,3-thiazino[3',2':1,2]pyrido[3,4-b]indol-4-one, $\gamma_{max.}^{Nujol}$ 3219 cm.$^{-1}$ 9,10-dimethoxy-2,3,6,7,12,12b-hexahydro-4H-1,3-thiazino[3',2':1,2]pyrido[3,4-b]indol-4-one, $\gamma_{max.}^{Nujol}$ 3223 cm.$^{-1}$ 8-nitro-2,3,6,7,12,12b-hexahydro-4H-1,3-thiazino[3',2':1,2]pyrido[3,4-b]indol-4-one, $\gamma_{max.}^{Nujol}$ 3215 cm.$^{-1}$ 10-nitro-2,3,6,7,12,12b-hexahydro-4H-1,3-thiazino[3',2':1,2]pyrido[3,4-b]indol-4-one, $\gamma_{max.}^{Nujol}$ 3218 cm.$^{-1}$

I claim:

1. A compound selected from those of the formula wherein $R^1$ and $R^2$ each represent a substituent selected from the group which consists of hydrogen, halogen, lower alkoxy containing from 1 to 3 carbon atoms and nitro.

2. 2,3,6,7,12,12b - hexahydro-4H - 1, 3 - thiazino-[3',2':1,2]pyrido[3,4-b]indol - 4 - one, as claimed in claim 1.

3. 10 - chloro - 2,3,6,7,12,12b - hexahydro - 4H - 1,3-thiazino[3',2':1,2]pyrido[3,4-b]indol - 4 - one, as claimed in claim 1.

4. 11 - chloro - 2,3,6,7,12,12b-hexahydro - 4H - 1,3-thiazino[3',2':1,2]pyrido[3,4-b]indol - 4 - one, as claimed in claim 1.

5. 10 - methyl - 2,3,6,7,12,12b - hexahydro - 4H - 1,3-thiazino[3',2':1,2]pyrido[3,4-b]indol - 4 - one, as claimed in claim 1.

6. 9 - methoxy - 2,3,6,7,12,12b - hexahydro - 4H-1,3-thiazino[3',2':1,2]pyrido[3,4-b]indol - 4 - one, as claimed in claim 1.

7. 10 - methoxy - 2,3,6,7,12,12b - hexahydro-4H-1,3-thiazino[3',2':1,2]pyrido[3,4-b]indol - 4 - one, as claimed in claim 1.

8. 9,10 - dimethoxy - 2,3,6,7,12,12b - hexahydro-4H-1,3-thiazino[3',2':1,2]pyrido[3,4-b]indol - 4 - one, as claimed in claim 1.

9. 8 - nitro - 2,3,6,7,12,12b - hexahydro - 4H - 1,3-thiazino[3',2':1,2]pyrido[3,4-b]indol - 4 - one, as claimed in claim 1.

10. 10 - nitro - 2,3,6,7,12,12b - hexahydro - 4H - 1,3- thiazino[3',2':1,2]pyrido[3,4-b]indol - 4 - one, as claimed in claim 1.

References Cited

UNITED STATES PATENTS 3,455,933 7/1969 Georgiadis et al. ____ 260—243X
3,476,750 11/1969 Humber _____ 260—243

HENRY R. JILES, Primary Examiner

J. M. FORD, Assistant Examiner

U.S. Cl. X.R.

260—296, 999